United States Patent
Sato et al.

(10) Patent No.: US 11,521,057 B2
(45) Date of Patent: Dec. 6, 2022

(54) LEARNING SYSTEM AND LEARNING METHOD

(71) Applicants: DENSO IT LABORATORY, INC., Tokyo (JP); Tokyo Institute of Technology, Tokyo (JP)

(72) Inventors: Ikuro Sato, Tokyo (JP); Ryo Fujisaki, Tokyo (JP); Akihiro Nomura, Tokyo (JP); Yosuke Oyama, Tokyo (JP); Satoshi Matsuoka, Tokyo (JP)

(73) Assignees: DENSO IT LABORATORY, INC., Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 1404 days.

(21) Appl. No.: 15/795,691

(22) Filed: Oct. 27, 2017

(65) Prior Publication Data
US 2018/0181863 A1 Jun. 28, 2018

(30) Foreign Application Priority Data
Dec. 27, 2016 (JP) .............................. JP2016-253169

(51) Int. Cl.
G06N 3/08 (2006.01)
G06F 17/10 (2006.01)
G06N 3/04 (2006.01)

(52) U.S. Cl.
CPC ............... *G06N 3/08* (2013.01); *G06F 17/10* (2013.01); *G06N 3/0454* (2013.01); *G06N 3/084* (2013.01)

(58) Field of Classification Search
None
See application file for complete search history.

(56) References Cited

PUBLICATIONS

"Synchronous and Asynchronous Migration in Adaptive Differential Evolution Algorithms" By Bujok (Year: 2019).*
"A Novel HVDC Double-Terminal Non-Synchronous Fault Location Method Based on Convolutional Neural Network" by Lan (Year: 2019).*
R. Wu, et al., "Deep Image: Scaling up Image Recognition", arXiv: 1501.02876v2, Baidu Research, 2015.
C. M. Bishop, "Neural Networks for Pattern Recognition", Clarendon Press, 1996, pp. 267-268.
Y. Nesterov, "Soviet Mathematics Doklady", Soviet Math Doki, 1983, pp. 372-376, vol. 27, No. 2.
I. Sutskever, "Training Recurrent Neural Networks", PhD Thesis, 2013.
J. Dean, et al., "Large Scale Distributed Deep Networks", NIPS, 2012.
Zhang, Wei, et al., "Staleness-Aware ASYNC-SGD for distributed Deep Learning", Under review as a conference paper at ICLR 2016, arxiv [online] URL; https://arxiv.org/pdf/1511.05950v1.pdf, dated Nov. 18, 2015, Retrieved on Mar. 5, 2020, vol. 1, pp. 1-11.
Decision to Grant issued in Japanese Patent Application No. 2016-253169 dated Mar. 24, 2020.

* cited by examiner

*Primary Examiner* — Evren Seven
(74) *Attorney, Agent, or Firm* — Pearne & Gordon LLP

(57) ABSTRACT

According to one embodiment of the present disclosure, provided is a learning system that updates a parameter for a neural network, the learning system including: a plurality of differential value calculators; and a parameter update module.

14 Claims, 8 Drawing Sheets

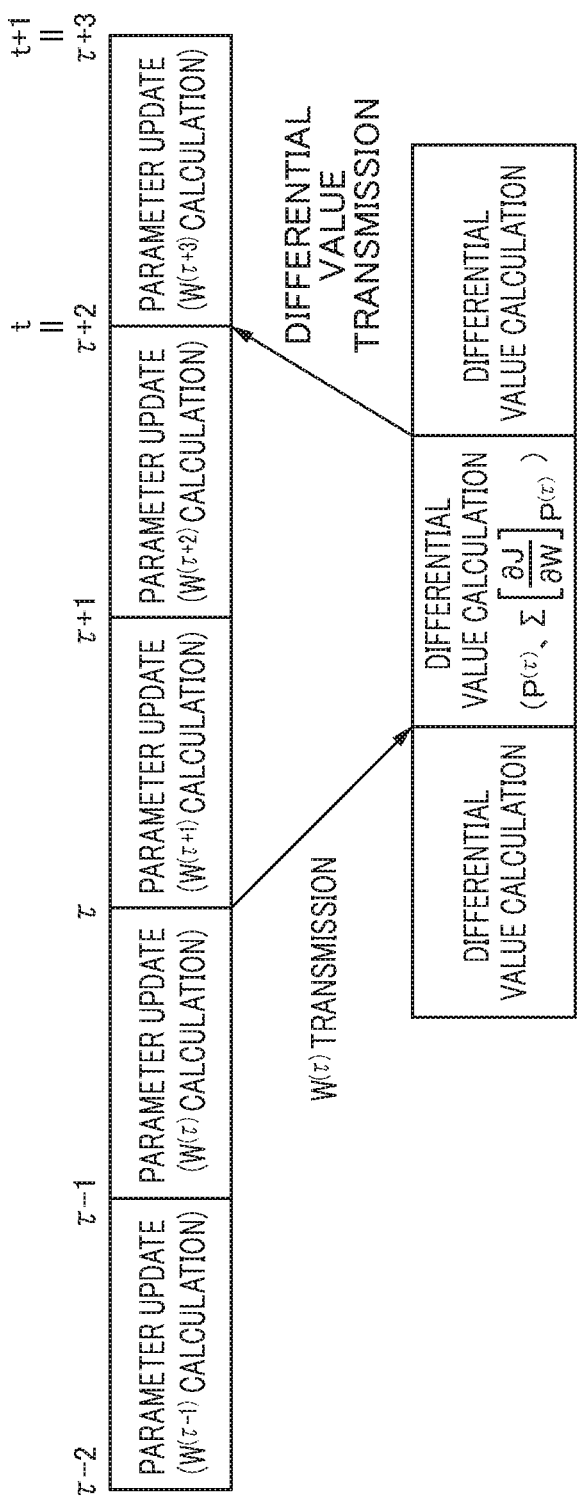
FIG.6A
FIG.6B
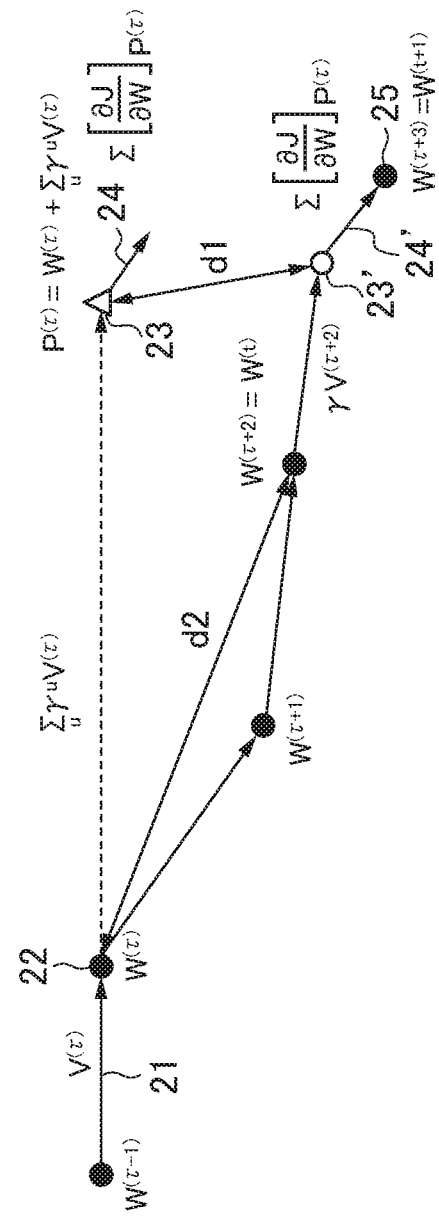
FIG.6C

LEARNING SYSTEM AND LEARNING METHOD

CROSS-REFERENCE TO RELATED APPLICATIONS

This application claims the benefit of Japanese Priority Patent Application JP 2016-253169 filed on Dec. 27, 2016, the entire contents of which are incorporated herein by reference.

FIELD

The present technology relates to a learning system and a learning method that update parameters for neural networks.

BACKGROUND AND SUMMARY

In the field of image recognition, there is a problem called general object recognition. This is a problem in estimating the types (classes) of objects such as a bird and a vehicle in images. In recent years, there have been remarkable improvements in recognition performance to solve the general object recognition problem. This is largely owing to convolution neural networks (hereinafter referred to as CNN; see Non-patent literature 1, for example) each having a large number of layers.

In the field of image recognition, various recognition algorithms have been suggested in the past. However, as the amounts of learning data (sets of input data and correct solutions) have become enormous, the recognition performance of a CNN tends to be higher than that of the other algorithms. As pointed out before, a CNN has great ability to express a model, but has a problem called "over-training", specializing excessively in the features of learning data. However, the amounts of learning data are now reaching such a level as to be capable of avoiding the problem of over-training.

PRIOR ART DOCUMENTS

Non-Patent Literature

[Non-patent literature 1]
Ren Wu, Shengen Yan, Yi Shan, Qingqing Dang, and Gang Sun, "Deep Image: Scaling up Image Recognition", arXiv:1501.02876v2.
[Non-patent literature 2]
C. M. Bishop, "Neural Networks for Pattern Recognition", p 267-268, Clarendon Press (1996).
[Non-patent literature 3]
Y. Nesterov, "A method for unconstrained convex minimization problem with the rate of convergence o(1/k2)". DokladyANSSSR (translated as Soviet.Math.Docl.), vol. 269, pp. 543-547 (1983).
[Non-patent literature 4]
I. Sutskever, "Training Recurrent neural Networks", PhD Thesis, (2013).
[Non-patent literature 5]
J. Dean, et al., "Large Scale Distributed Deep Networks", NIPS 2012.

The excellent recognition performance is a great advantage of a CNN, but the long learning time is the drawback of a CNN. Data related to social networks, data related to automatic driving, and the like are just a few examples of data that will continue to increase in the future. In view of this trend, the learning time might someday become too long, and the learning might not be completed within a reasonable amount of time. In some cases, learning might take as long as one or more years. In such cases, commercialization is not realistic, and an algorithm other than a CNN might be inevitably used, even if the algorithm does not excel in recognition performance as much as a CNN. That is, a drastic reduction in neural-network learning time is critical in industrial application of neural-network learning.

Therefore, there is a demand for a learning system and a learning method that can update parameters for neural networks at higher speed.

According to one embodiment of the present disclosure, provided is a learning system that updates a parameter for a neural network, the learning system including: a plurality of differential value calculators; and a parameter update module, wherein each of the differential value calculators, which are not synchronized with one another, receives a parameter of a certain time from the parameter update module, calculates a differential value to be used for updating the parameter, based on the received parameter, and transmits the differential value to the parameter update module, the parameter update module receives the differential value from the differential value calculator, updates the parameter based on the received differential value, not in synchronization with differential value calculation by the plurality of differential value calculators, and transmits the updated parameter to the plurality of differential value calculators, and, when calculating the differential value, the differential value calculator takes staleness into account, the staleness corresponding to a number of times the parameter is updated during a period between a time when the parameter is received and a time when the calculated differential value is used by the parameter update module in updating the parameter.

In an asynchronous distributed system, staleness is taken into account, and thus, parameters can be updated at high speed.

Preferably, taking the staleness into account, the differential value calculator calculates a predicted value of a parameter of a time when the calculated differential value is used by the parameter update module in updating the parameter, and calculates the differential value by differentiating the predicted value.

In this case, preferably, the differential value calculator calculates the predicted value, based on the parameter of the certain time and a parameter of an earlier time than the certain time, and the staleness.

Specifically, when the parameter of the certain time $\tau$ is represented by $W^{(\tau)}$, the parameter of the earlier time $(\tau-1)$ than the certain time is represented by $W^{(\tau-1)}$, the staleness is represented by $s_n$, and a coefficient $\gamma \varepsilon (0,1)$, the predicted value $P^{(\tau)}$ may be expressed by the equation:

[Mathematical Formula 1]

$$P^{(\tau)} = W^{(\tau)} + \sum_{u=1}^{s_n+1} \gamma^u (W^{(\tau)} - W^{(\tau-1)})$$

As a predicted value close to the parameter to be used in the update, instead of the received parameter, is differentiated, parameters can be updated at high speed.

The differential value calculator gradually may increase the coefficient $\gamma$ to a large value, as learning progresses.

The parameter update module may update the parameter using a value obtained by multiplying the differential value by a learning coefficient, and increases the learning coefficient to a large value as learning progresses.

The parameter update module adjusts an update amount of the parameter, to prevent an absolute value or a norm of the update amount of the parameter from exceeding a first value until the parameter is updated a first number of times since a start of learning.

In this manner, the objective function can be prevented from becoming unstable in an early stage of learning.

According to another embodiment of the present disclosure, provided is a learning method to update a parameter for a neural network, the learning method comprising: each of a plurality of differential value calculators, which are not synchronized with one another, receiving a parameter of a certain time from a parameter update module, calculating a differential value to be used for updating the parameter, based on the received parameter, transmitting the differential value to the parameter update module; the parameter update module receiving the differential value from the differential calculators; updating the parameter based on the received differential value, not in synchronization with differential value calculation by the plurality of differential value calculators; and transmitting the updated parameter to the plurality of differential value calculators, wherein upon calculating the differential value by the differential value calculator, staleness is taken into account by the differential value calculator, the staleness corresponding to a number of times the parameter is updated during a period between a time when the parameter is received and a time when the calculated differential value is used by the parameter update module in updating the parameter.

As staleness is taken into account, parameters can be updated at high speed.

BRIEF DESCRIPTION OF DRAWINGS

FIGS. 6A to 6C are diagrams for explaining parameter update in this embodiment;

DESCRIPTION

The following is a detailed description of embodiments of the present technology, with reference to the accompanying drawings.

Figure 1:
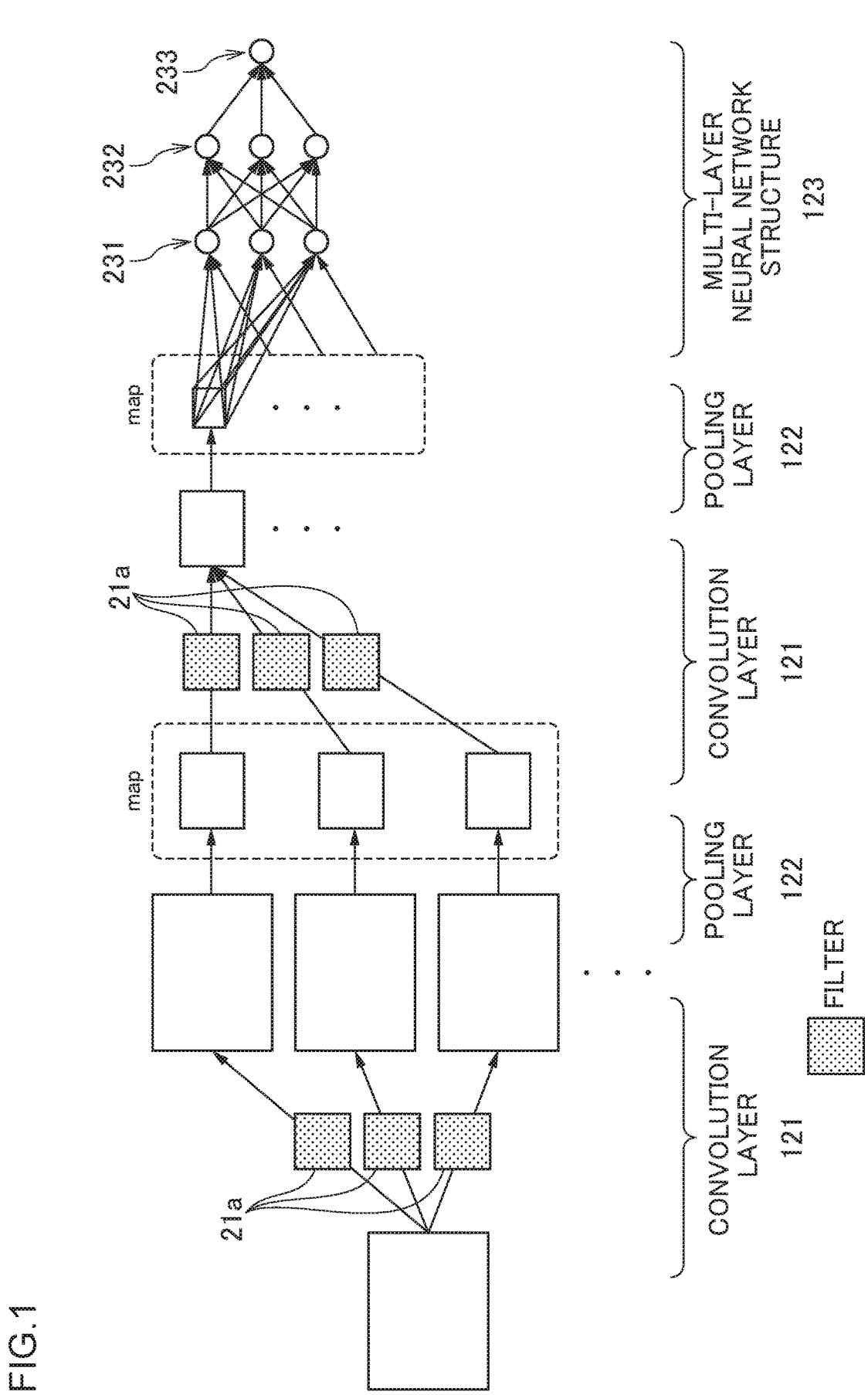
FIG. 1 is a diagram schematically showing an example of a CNN structure.

FIG. 1 is a diagram schematically showing an example of a CNN structure. A CNN includes one or more sets of a convolution layer 121 and a pooling layer 122, and a multi-layer neural network structure 123. A recognition object (which can be image data) is inputted to the convolution layer 121 of the first stage. A recognition result is then outputted from the multi-layer neural network structure 123.

The convolution layer 121 performs convolution on input image data (the image data of the recognition object in the convolution layer 121 of the first stage, and the later described feature map in the convolution layers 121 of the second and later stages) by using filters 21a, and then performs non-linear mapping. The filters 21a are weights having elements of pixels, and each weight may include a bias.

The pooling layer 122 performs a pooling operation to lower the resolution of the image data supplied from the convolution layer 121, and generates a feature map.

The multi-layer neural network structure 123 includes an input layer 231, one or more hidden layers 232, and an output layer 233. The feature map from the pooling layer 122 of the last stage is inputted to the input layer 231. The one or more hidden layers 232 perform a product-sum operation, using weights. The output layer 233 outputs the final result of a CNN process.

The weights of the filters 21a in the convolution layer 121 and the weights in the hidden layers 232 are the parameters for neural networks, and it is necessary to learn these parameters in advance. The learning in this case is to optimize the parameters by updating the parameters so that the CNN returns an ideal output when image data is inputted as the recognition object. Specifically, the parameters are iteratively updated until a predetermined objective function converges to the minimum value. An objective function is a function obtained by combining functions (such as square errors or cross entropies) generated by quantifying differences between the CNN and ideal output values, the number of the functions combined being equal to the total number of sets of learning data. An objective function is a parameter function. A CNN with a smaller objective function is more preferable.

In this embodiment, a technique to be used for minimizing an objective function is a gradient method called a mini-batch stochastic gradient method, which is described next. In learning, image data as the recognition object and a large number of pieces of learning data are used. The learning data is a set of ideal output values corresponding to the image data. In the mini-batch stochastic gradient method, not all the learning data is used in updating the parameters once, but part of the learning data is used in updating the parameters once. A mini batch is the set of learning data to be used in updating the parameters once, and a mini batch size indicates the number of pieces of learning data constituting a mini batch.

In the mini-batch stochastic gradient method, learning data is first randomly picked out from all the learning data, and a mini batch is created. With the mini batch, a differential value with respect to the parameters of the objective function is calculated. With the differential value, the parameters are updated. This operation will be described in greater detail.

The objective function is $J(x; W)$. Here, x represents the input data, and W represents the set of parameters. Where the parameters in the iteration for the "t"th time are represented by $W^{(t)}$, the update formula for obtaining the (t+1)th-time parameters in the mini-batch stochastic gradient method is expressed by the following equation.

[Mathematical Formula 2]

$$W^{(t+1)} = W^{(t)} - \eta \sum_{i=1}^{m} \left[\frac{\partial J(x_{r_{(i,t)}}; W)}{\partial W}\right]_{W^{(t)}} \quad (1)$$

Here, $x_{r(i,t)}$ represents the r(i, t)th data in the data set, r(i,t) represents the index of data subjected to ith random sampling when the parameters of time t (the number indicating the number of iterations performed so far is also called "time") are used. Meanwhile, η represents a positive number called a learning coefficient. Further, m represents the mini batch size. The second term on the right-hand side is the differential value, and a point in the parameter space is shown on the lower right side of the brackets ([ ]) in which the differential value is shown. This means that the differential value is calculated at this point. In the update formula (1), the differential value shown in the brackets ([ ]) is calculated with respect to the parameters $W^{(t)}$ of time t.

The update formula (1) is known as a steepest descent method using a mini batch. That is, the vector of the second term on the right-hand side indicates the steepest descent direction of the objective function J defined by the mini batch.

By learning a large-scale data set with the use of this mini-batch stochastic gradient method, a multi-layer neural network can achieve high generalization capability (accuracy of estimating unknown data).

Techniques for increasing learning convergence speed in the mini-batch stochastic gradient method have already been studied, and the following is a description of two well-known conventional techniques.

[Momentum Method] (See Non-Patent Literature 2)

A parameter update formula is expressed by the following equations.

[Mathematical Formula 3]

$$V^{(t)} = \gamma V^{(t-1)} - \eta \sum_{i=1}^{m} \left[\frac{\partial J(x_{r_{(i,t)}}; W)}{\partial W}\right]_{W^{(t)}} \quad (2)$$

$$W^{(t+1)} = W^{(t)} + V^{(t)}$$

V is a term called a momentum term, and represents a weighted average of differentials of the objective function calculated in the past. The weight is adjusted with a momentum coefficient γε(0,1), and is normally set at 0.9, for example. If the differential value has a chronological correlation in the update formula, the momentum term V can be regarded as the main term, and the differential value can be regarded as a correction term in the update formula.

By the momentum method, in a case where the differential value has a high correlation around time t, a wider step can be allocated to one parameter update operation, and thus, the time required for convergence can be shortened.

[Nesterov Accelerated Gradient (hereinafter referred to as NAG method) (see Non-patent literatures 3 and 4), vol. 269, pp. 543-547 (1983), and "Training Recurrent Neural Networks", I. Sutskever, PhD Thesis, (2013))

A parameter update formula is expressed by the following equations.

[Mathematical Formula 4]

$$V^{(t+1)} = \gamma V^{(t)} - \eta \sum_{i=1}^{m} \left[\frac{\partial J(x_{r_{(i,t)}}; W)}{\partial W}\right]_{W^{(t)} + \gamma V^{(t)}} \quad (3)$$

$$W^{(t+1)} = W^{(t)} + V^{(t+1)}$$

The difference from the momentum method is the point where the differential value is calculated in the parameter space. While the differential value is calculated with the parameters $W^{(t)}$ of time t in the momentum method, the differential value is calculated with the use of $W^{(t)} + \gamma V^{(t)}$ in the NAG method (see the lower right side of the brackets ([ ]) in which the differential value is shown). That is, in the NAG method, the momentum term V in the past is first added as the main term, and the differential value with respect to the result of the addition is calculated as a correction term and is then added.

Figure 2:
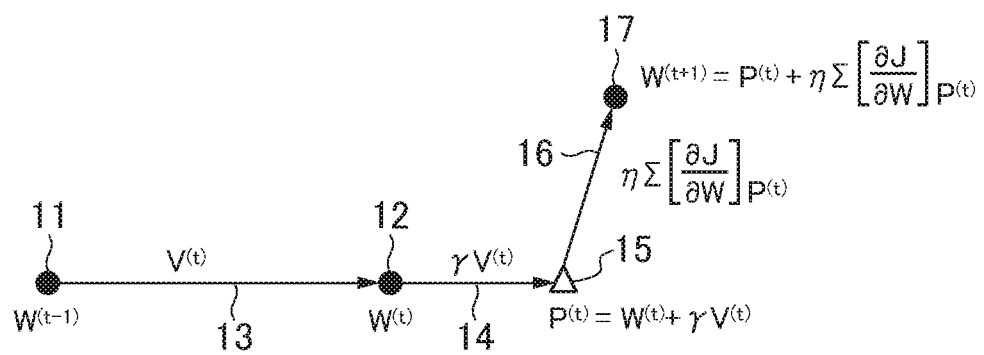
FIG. 2 is a diagram for explaining parameter update by NAG method.

Referring now to FIG. 2, the NAG method is described in greater detail. FIG. 2 is a diagram for explaining that the parameters $W^{(t-1)}$ (reference numeral 11) of time (t−1) are updated to obtain the parameters $W^{(t)}$ (reference numeral 12) of time t, and the parameters $W^{(t+1)}$ of time (t+1) are then obtained. According to the above equations (3), the parameters $W^{(t+1)}$ can be expressed by the equations shown below. In the equations shown below, the arguments of the objective function J are not shown.

[Mathematical Formula 5]

$$W^{(t+1)} = W^{(t)} + V^{(t+1)}$$

$$= W^{(t)} + \gamma V^{(t)} - \eta \sum_{i=1}^{m} \left[\frac{\partial J}{\partial W}\right]_{W^{(t)} + \gamma V^{(t)}}$$

$$= P^{(t)} - \eta \sum_{i=1}^{m} \left[\frac{\partial J}{\partial W}\right]_{P^{(t)}}$$

Here, $P^{(t)} = W^{(t)} + \gamma V^{(t)}$. In FIG. 2, the vector (reference numeral 13) from the parameters $W^{(t-1)}$ toward the parameters $W^{(t)}$ is the momentum term $V^{(t)}$. The point defined by adding a weighted momentum term $\gamma V^{(t)}$ (reference numeral 14) as the main term to the parameters $W^{(t)}$ is the point $P^{(t)}$ (reference numeral 15).

At the point $P^{(t)}$ changed by the main term, the differential value

[Mathematical Formula 6]

$$\sum_{i=1}^{m} \left[\frac{\partial J}{\partial W}\right]_{P^{(t)}}$$

as a correction term is calculated. As a weighted differential value (reference numeral 16)

[Mathematical Formula 7]

$$\eta \sum_{i=1}^{m} \left[\frac{\partial J}{\partial W}\right]_{p(t)}$$

is added to $P^{(t)}$, the parameters $W^{(t+1)}$ (reference numeral 17) of time (t+1) are obtained.

It is empirically known that, in many cases, both the momentum method and the NAG method can speed up stochastic gradient. By the momentum method or the NAG method described above, learning speed can be increased to a certain level. However, in cases where the number of pieces of data is extremely large, a sufficiently large increase in speed is yet to be achieved.

Therefore, the present technology aims to further shorten the learning time by using a computing machine cluster that connects computing machines (also referred to as nodes) including a CPU and a GPU with a high-speed communication line, and adopting a system for performing distributed processing on the calculation required in learning (this system will be hereinafter referred to as the distributed system).

First Embodiment

In the distributed system, classification can be made in accordance with 1) what is to be communicated, 2) with what the communication is to be made, and 3) when the communication is to be made.

First, as to "what is to be communicated", there are a "model parallel" method and a "data parallel" method. In the model parallel method, models are distributed among the computing machines, and intermediate variables of the neural network are communicated. In the data parallel method, model calculation is performed within each individual computing machine, and the differential values or the like calculated by the respective computing machines are communicated.

In the data parallel method, different pieces of data are processed by the respective computing machines, and thus, a large number of pieces of data can be simultaneously processed. In a case where the mini-batch stochastic gradient method is used, data parallel computing in the mini batches makes sense, and therefore, data parallel computing is supposed to be mainly performed in this specification.

The model parallel method is useful in a giant neural network that cannot be stored in a memory. Since the model parallel method is used for special purposes of use, the model parallel method is not explained in this specification. However, the present technology is effective in using "old parameters" that will be described later, and therefore, the present technology can be applied to both the model parallel method and the data parallel method.

As to "with what the communication is to be made", there is a method using one-to-one communication between a "parameter server" that manages parameters and a "worker node" that calculates differential values (see "Large Scale Distributed Deep Networks", J. Dean, et al., NIPS 2012, for example), and a method using whole communication among all worker nodes (all-to-all communication) without a parameter server. In the former method, a worker node communicates only with the parameter server, and communication between worker nodes is not performed in principle. The present technology can be applied to both of the methods.

As to "when the communication is to be made", there is a synchronous method and an asynchronous method.

Figure 3:
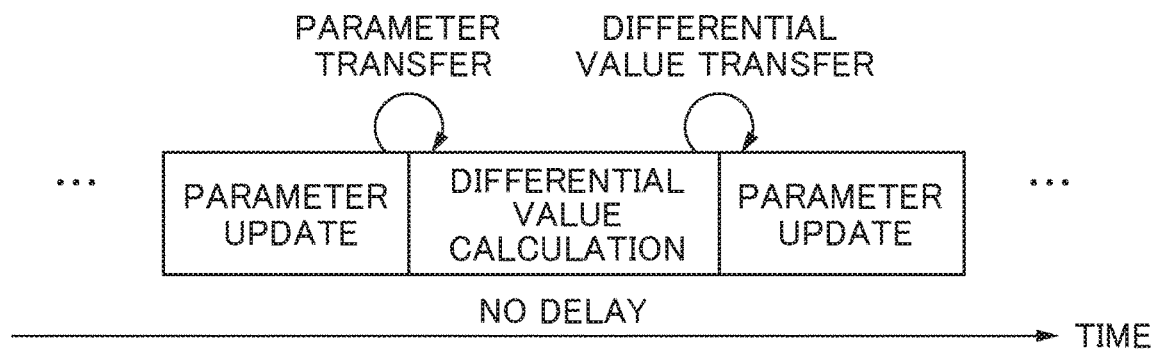
FIG. 3 is a schematic diagram for explaining timings of differential value calculation and parameter update in a synchronous method.

FIG. 3 is a schematic diagram for explaining timings of differential value calculation and parameter update in a synchronous method. In the synchronous method, the nodes synchronously calculate differential values. Specifically, after the node that is the slowest in calculating finishes calculating a differential value, the parameters are updated with the use of differential values supplied from all the nodes, and all the nodes then start calculating the next differential values at once, using the updated, new parameters. This is the basic flow of processing. Therefore, because the nodes need to stand by, the synchronous method is inefficient, and the frequency of update is low.

However, in the synchronous method, the sequential order in differential value calculation and parameter update is maintained, and accordingly, the update formula in a conventional mini-batch stochastic gradient method is expressed by the following equation.

[Mathematical Formula 8]

$$W^{(t+1)} = W^{(t)} - \eta \sum_{n=1}^{\#nodes} \sum_{i=1}^{k} \left[\frac{\partial J(x_{r(i,n,t)}; W)}{\partial W}\right]_{W^{(t)}} \quad (4)$$

Here, k represents the number of pieces of data to be simultaneously processed by the computing nodes. Further, r(i,n,t) represents the index of data on which a node n is performed ith random sampling when the parameters of time t are used. Meanwhile, #nodes represents the number of nodes that calculate differential values. The only difference from the update formula (1) in the case where a single node is used is that the same number of differential values as the number of nodes are combined. Here, the mini batch size is expressed as #nodes×k.

Because of the above, in the synchronous method, the update formula (1), which is the steepest descent method using a mini batch, is properly calculated, and the objective function J(x; W) decreases in a monotonous manner. In a case where the momentum method or the NAG method is implemented, the above update formula (2) or (3) is properly calculated. Accordingly, in either case, convergence is guaranteed in the synchronous method, and the speed of descent of the objective function J(x; W) in one update operation is high.

Figure 4:
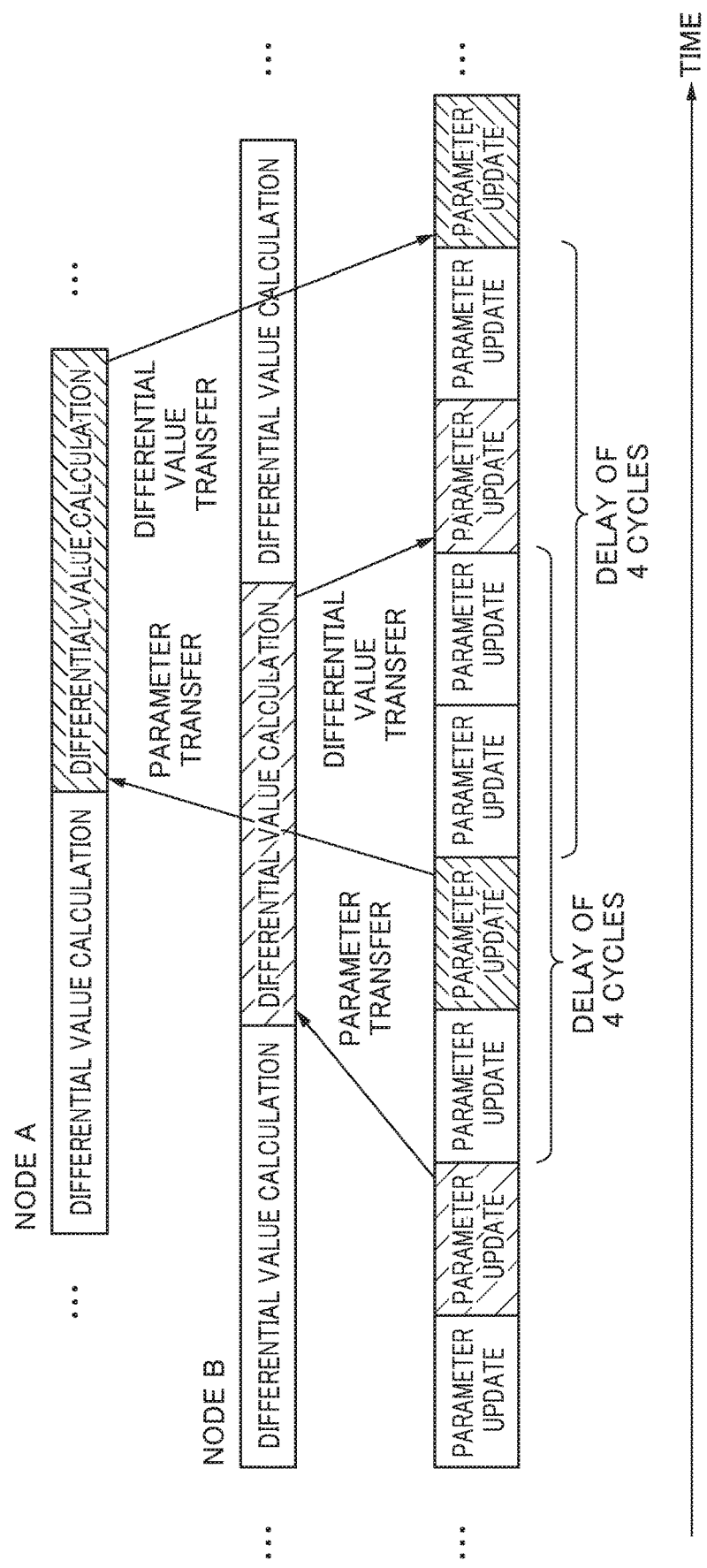
FIG. 4 is a schematic diagram for explaining timings of differential value calculation and parameter update in an asynchronous method.

FIG. 4 is a schematic diagram for explaining timings of differential value calculation and parameter update in an asynchronous method. In the asynchronous method, the nodes asynchronously calculate differential values and update parameters. In the asynchronous method, all the nodes update parameters without waiting for completion of differential value calculation. The nodes are not synchronized with one another, and iteratively calculate differential values without intermission. Accordingly, the nodes can operate with high efficiency without any standby time, and the frequency of update is high.

In the asynchronous method, however, each node is allowed to update the parameters while some other node is calculating a differential value, and therefore, the parameters held by each node become gradually older. That is, the significant difference from the synchronous method is that old parameters are used in calculating a differential value. With this being taken into account, the update formula in the mini-batch stochastic gradient method is expressed by the following equation, for example.

[Mathematical Formula 9]

$$W^{(t+1)} = W^{(t)} - \eta \sum_n \sum_{i=1}^{k} \left[\frac{\partial J(x_{r_{(i,n,\tau)}}; W)}{\partial W}\right]_{W^{(\tau)}}, \quad (5)$$

$$\tau = \tau(n) \leq t$$

The difference from the update formula (4) in the synchronous method is that time t of the parameters for calculating a differential value is earlier than the current time t. Here, τ may differ among the nodes. In this specification, any method in which parameters at a lagged time are used in calculating a differential value is classified as an asynchronous method without exception, even if a majority of computing machines use a synchronous update rule.

Due to old parameters, the vector of the second term in the update formula (5) cannot be guaranteed to have the steepest descent direction. Therefore, the update formula (5) in the asynchronous method is not strictly of the steepest descent method, and the speed of descent of the objective function J(x; W) in one update operation is lower than that in the synchronous method. Although convergence is not theoretically guaranteed, there is a report that convergence can be achieved by an asynchronous method without any problem (See Non-patent literature 5).

As described above, in the case of a conventional synchronous method, the speed of descent of the objective function J(x; W) in one update operation is high, but the frequency of update is low. In the case of a conventional asynchronous method, on the other hand, the frequency of update is high, but the speed of descent of the objective function J(x; W) in one update operation is low.

Therefore, if the speed of descent of the objective function J(x; W) in one update operation can be increased in an asynchronous method, the speed of asynchronous learning can be increased. In view of this, the present technology is to improve the conventional NAG method to learning with "staleness" as described below, on the assumption that an asynchronous distributed system is used.

Figure 5:
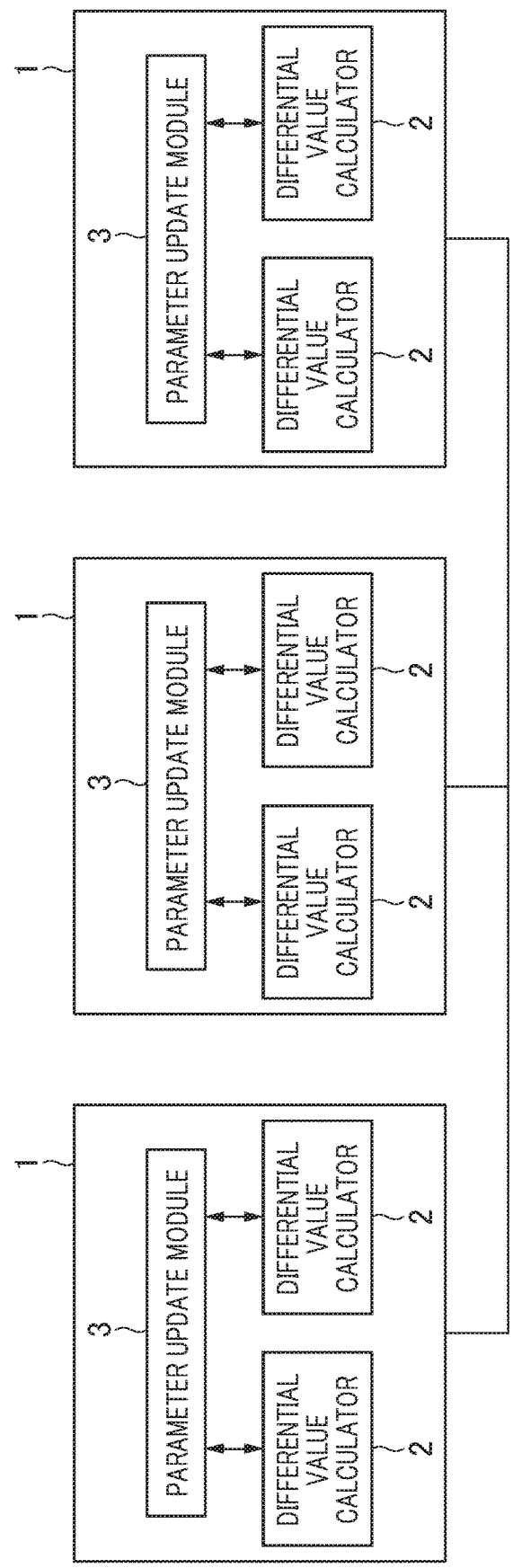
FIG. 5 is a schematic block diagram showing an example configuration of a distributed learning system according to an embodiment.

FIG. 5 is a schematic block diagram showing an example configuration of a distributed learning system according to an embodiment. The learning system is formed with nodes 1 that can communicate with one another, and each of the nodes 1 includes differential value calculators 2 and a parameter update module 3. Each differential value calculator 2 is a graphics processing unit (GPU), for example, and calculates a differential value of parameters at a certain time. The parameter update module 3 is a central processing unit (CPU), for example, and updates parameters by a gradient method, using the calculated differential values.

In the asynchronous distributed system, each node of the learning system includes more than one differential value calculator 2. These differential value calculators 2 are not synchronized with one another, receive parameters from the parameter update module 3, calculate differential values, and transmit the differential values to the parameter update module 3. The parameter update module 3 receives the differential values, and updates the parameters with the received differential values, not in synchronization with the differential value calculation performed by the differential value calculators 2, or without waiting for reception of the differential values from all the differential value calculators 2. The parameter update module 3 then transmits the updated parameters to each differential value calculator 2.

In an asynchronous distributed learning method, old parameters are inevitably used in calculating differential values. New parameters are generated with the differential values calculated with the old parameters, but the differential values are not exactly the same as the differential values that should originally be used (the differential values calculated with new parameters), which lowers the speed of descent of the objective function J in one update operation. As the parameters used in calculating differential values become older, the accuracy of approximation of the differential values becomes lower, and the speed of descent of the objective function J in one update operation becomes lower.

That is, the distance ($\|W^{(\tau)} - W^{(t)}\|_2$, for example) between the parameters $W^{(\tau)}$ used in calculating differential values and the parameters $W^{(t)}$ at the time of update using the differential values can be considered an index that characterizes the accuracy of approximation of differential values. In the present technology, this distance is shortened, to increase the accuracy of approximation of differential values.

When a differential value calculator 2 receives parameters, the differential value calculator 2 may predict the parameters of a future time at which differential values are transferred, and calculate a differential value at the predicted point of time. However, if the calculation in the prediction takes a long time, the speed of learning is not increased. Therefore, the prediction needs to be performed with the smallest possible amount of calculation.

In the description below, the parameter update from time t to time t+1 in an asynchronous stochastic gradient method is explained. It should be noted that the time number τ of the parameters held by the differential value calculator 2 that provides differential values is of course equal to or smaller than time t. A case where a completely asynchronous method (a method not involving synchronization between differential value calculation and parameter update) is implemented is now described. The oldness of parameters is called "staleness s". The staleness s indicates the number of times the parameters are updated between the time when the differential value calculator 2 receives the parameters and the time when the differential value calculated by the differential value calculator 2 is used by the parameter update module 3 in updating the parameters. For example, in an asynchronous system in which the differential value calculation cycles match the parameter update cycles, there always is a delay equivalent to two cycles, the staleness s is 2 (s=2).

In the present technology, the update formula is as follows.

[Mathematical Formula 10]

$$V^{(t+1)} = \gamma V^{(t)} - \eta \sum_n \sum_{i=1}^{k} \left[\frac{\partial J(x_{r_{(i,n,\tau)}}; W)}{\partial W}\right]_{W^{(\tau)} + \sum_{u=1}^{s+1} \gamma^u V^{(\tau)}}, \quad (6)$$

$$\tau = \tau(n) \leq t$$
$$W^{(t+1)} = W^{(t)} + V^{(t+1)}$$

Here, $s_n$ represents the staleness in the nth differential value calculator 2 The staleness $s_n$ may be determined after the staleness of the parameters in each differential value calculator 2 is measured. Alternatively, in a case where all the differential value calculators 2 have almost the same staleness, $s_n$ may be a fixed value determined through rounding down, rounding up, or rounding off of mean staleness.

In this update formula (6), the NAG method is applied to an asynchronous distributed system. However, the NAG method is not merely applied, but the staleness $s_n$ is taken into consideration, which is a significant feature of the present technology. In the update formula (6), the parameters of a future time that is ahead by an amount equivalent to the staleness $s_n$ are predicted with the use of the main term of weight update. More specifically, the amount

[Mathematical Formula 11]

$$\sum_{u=1}^{s_n+1} \gamma^u V^{(\tau)}$$

obtained by combining the values calculated by weighting the momentum of the current time with a power of $\gamma\epsilon(0,1)$ in a sequential order from the current time is added to the parameters $W^{(\tau)}$ of time t, so that $P^{(\tau)}$ is obtained. Calculating $P^{(\tau)}$ corresponds to predicting the parameters further changed from time t with the momentum term as the main term of update at time $\tau$, and, in this regard, $P^{(\tau)}$ is also referred to as the predicted value in this specification. That is, the predicted value $P^{(\tau)}$ in the present technology depends on the staleness $s_n$, and is expressed by the following equation.

[Mathematical Formula 12]

$$P^{(\tau)} = W^{(\tau)} + \sum_{u=1}^{s_n+1} \gamma^u V^{(\tau)} \quad (7)$$

$$= W^{(\tau)} + \sum_{u=1}^{s_n+1} \gamma^u (W^{(\tau)} - W^{(\tau-1)})$$

Referring now to FIGS. 6A to 6C, this aspect is described in greater detail. FIGS. 6A to 6C show an example where the differential value calculation cycles are the same as the parameter update cycles, and accordingly, the staleness $s_n$ is 2 (or t−τ=2).

FIG. 6A illustrates processing to be performed by the parameter update module 3. For example, the parameter update module 3 performs parameter update from time (τ−2) to time (τ−1), and parameters $W^{(\tau-1)}$ are obtained at time (τ−1). Likewise, at time τ, time (τ+1), time (τ+2), and time (τ+3), parameters $W^\tau$, parameters $W^{(\tau+1)}$, parameters $W^{(\tau+2)}$, and parameters $W^{(\tau+3)}$ are obtained, respectively.

FIG. 6B shows that a differential value calculator 2 (with number n) receives the parameters $W^{(\tau)}$, calculates a differential value, and then transmits the differential value to the parameter update module 3.

FIG. 6C illustrates the parameter update from time t to time (t+1). More specifically, the differential value calculator 2 calculates a differential value by using the parameters $W^{(\tau)}$, and the parameter update module 3 updates the parameters $W^{(t)}$ by using the differential value, to obtain the parameters $W^{(t+1)}$. Since s=2, $W^{(t)}=W^{(\tau+2)}$, and $W^{(t+1)}=W^{(\tau+3)}$.

This aspect is now described in greater detail. When the differential value calculator 2 receives the parameters $W^{(\tau)}$ (reference numeral 22), the differential value calculator 2 calculates the predicted value $P^{(\tau)}$ (reference numeral 23) according to the above equation (7), using the momentum term $V^{(\tau)}$ (reference numeral 21). This predicted value $P^{(\tau)}$ exists on the straight line extending from the parameters $W^{(\tau-1)}$ to the parameters $W^{(\tau)}$. That is, the differential value calculator 2 linearly calculates the predicted value $P^{(\tau)}$ from the parameters $W^{(\tau)}$ of time τ and the parameters $W^{(\tau-1)}$ of time (τ−1), which is earlier than time τ.

It should be noted that, where the staleness $s_n$ is greater, the distance between the predicted value $P^{(\tau)}$ and the parameters $W^{(\tau)}$ is longer. This is because, where the staleness $s_n$ is greater, which is where the difference between time τ and time t is larger, the parameters $W^{(\tau)}$ are updated by a larger amount at time t.

The differential value calculator 2 then calculates a differential value

[Mathematical Formula 13]

$$\sum_{i=1}^{k} \left[\frac{\partial J}{\partial W}\right]_{P^{(\tau)}}$$

of the predicted value $P^{(\tau)}$ (the arrow denoted by reference numeral 24 and the learning coefficient η are not shown). This predicted value $P^{(\tau)}$ indicates the predicted point indicated by reference numeral 23' as described later.

At the time when the differential value calculator 2 finishes the differential value calculation as above, the parameter update module 3 has already finished the calculation of the parameters $W^{(\tau+1)}$, and is updating the parameters $W^{(\tau+1)}$, to obtain the parameters $W^{(\tau+2)}$. After that, the parameters $W^{(\tau+2)}$ are obtained at time $(\tau+2)(=\tau+s_n)$ (see FIGS. 6A and 6B).

The parameter update module 3 then receives the differential value from the differential value calculator 2. The parameter update module 3 then updates the parameters $W^{(\tau+2)}$ by further adding the differential value (the arrow denoted by reference numeral 24') to the point (reference numeral 23') defined by adding the momentum term $\gamma V^{(\tau+2)}$ to the parameters $W^{(\tau+2)}$. In this manner, the parameter update module 3 obtains the parameters $W^{(\tau+3)}$ (reference numeral 25).

As described above, the differential value calculator 2 does not calculate a differential value of the received parameters $W^{(\tau)}$ of time τ, but calculates the predicted value $P^{(\tau)}$, and calculates a differential value of the predicted value $P^{(\tau)}$. In the present technology, the point 23' is predicted, and the predicted value is $P^{(\tau)}$ (reference numeral 23) That is, the differential value of the predicted value $P^{(\tau)}$ is used where the differential value at the point 23' should originally be used. The distance d1 between the point 23' and the predicted value $P^{(\tau)}$ is an error. Meanwhile, in a conventional method that does not involve such prediction, the differential value of the parameters $W^{(\tau)}$ is used where the differential value of the parameters $W^{(\tau)}$ should originally be used. The distance d2 between the parameters $W^{(\tau)}$ and the parameters $W^{(t)}$ is an error.

Figure 7:
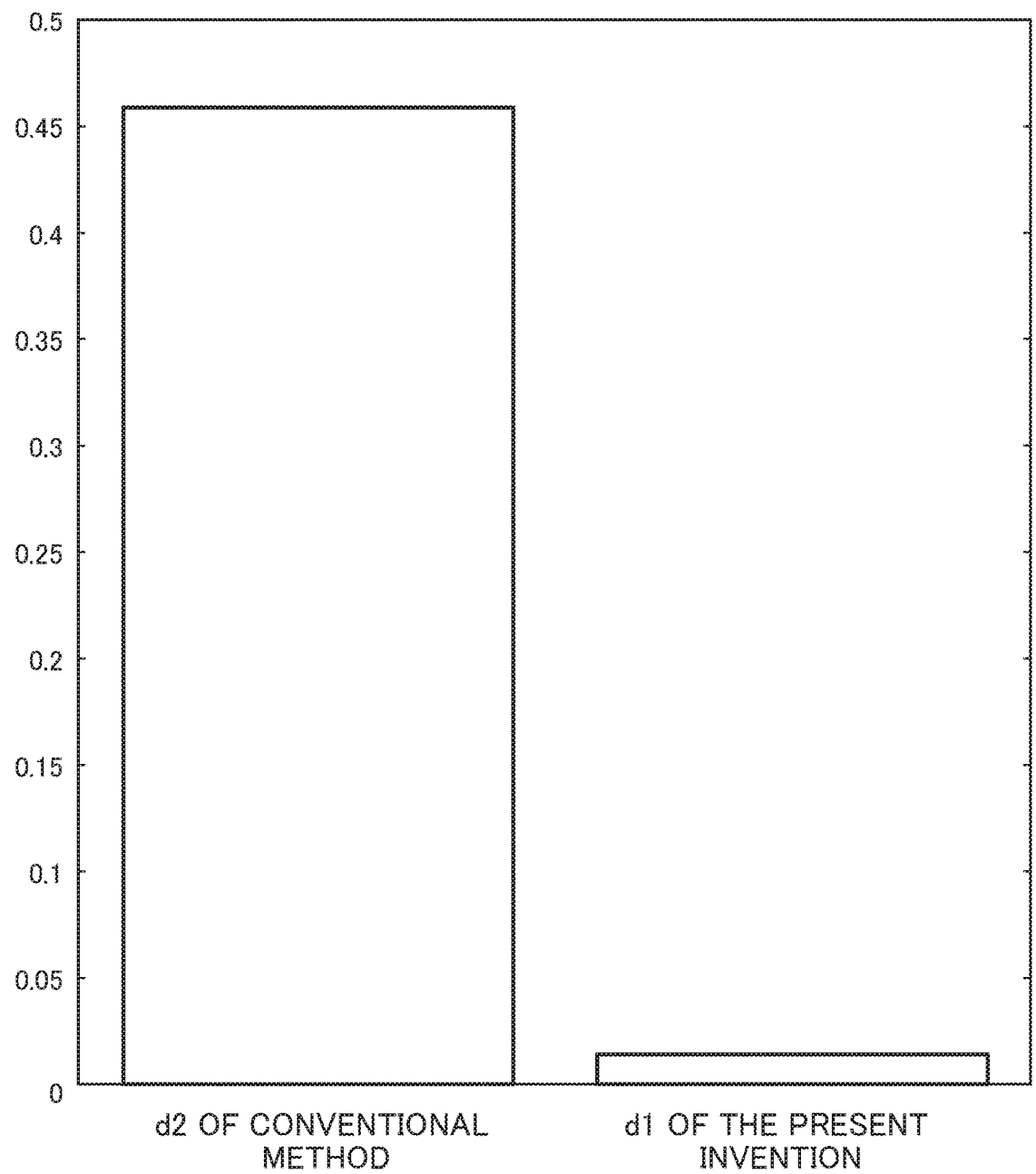
FIG. 7 is a graph showing comparison between an error d1 in this embodiment and an error d2 in a conventional method.

FIG. 7 is a graph showing comparison between the error d1 of the present technology and the error d2 of the conventional method in an asynchronous distributed learning system in which staleness s is 45. The conventional method is an asynchronous momentum method, and the parameters $W^{(\tau)}$ are used in differential value calculation. As shown in FIG. 7, the error d1 of the present technology is successfully reduced to about 1/34 of the error d2 of the conventional method. That is, the distance (error) between the parameters $W^{(\tau)}$ to be used in calculating a differential value and the parameters $W^{(t)}$ for performing update using the differential value can be made shorter, and the accuracy of differential value approximation can be increased.

The update formula (7) shows an example case where the predicted value $P^{(\tau)}$ is linearly calculated from the two successive sets of parameters $W^{(\tau-1)}$ and $W^{(\tau)}$. However, the differential value calculator 2 may use any appropriate number of successive or non-successive sets of parameters of earlier times than time τ, to linearly or non-linearly calculate the predicted value $P^{(\tau)}$.

For example, the differential value calculator 2 may calculate the predicted value $P^{(\tau)}$ from the three successive sets of parameters $W^{(\tau-2)}$, $W^{(\tau-1)}$, and $W^{(\tau)}$, using a quadratic function. In this case, the predicted value $P^{(\tau)}$ exists on the quadratic function passing through the three points $W^{(\tau-2)}$, $W^{(\tau-1)}$, and $W^{(\tau)}$, and the distance between the parameters $W^{(\tau)}$ and the predicted value $P^{(\tau)}$ is determined by the staleness s. In any case, the differential value calculator 2 should calculate the predicted value $P^{(\tau)}$, using the staleness s as well as at least two sets of parameters (the parameters at a predetermined time and the parameters at an earlier time than the predetermined time).

In another example, the predicted value $P^{(\tau)}$ may be calculated according to the equation shown below, though the calculation involves linear prediction.

$$P^{(\tau)} = W^{(\tau)} + cV^{(\tau)}$$  [Mathematical Formula 14]

Here, c represents the momentum coefficient, and is set at an optimum value in the following manner, for example. Before actual learning, preliminary learning is performed, and chronological changes in the parameters are obtained and saved. As a result, the momentum coefficient c that minimizes the error d1 shown in FIG. 6C can be estimated by the linear least-squares method. As the preliminary learning is performed in the same learning system as the actual learning, the optimum momentum coefficient c that reflects the staleness can be obtained. Alternatively, the momentum coefficient c may be estimated during the actual learning. As the momentum coefficient c set in this manner is used in the actual learning, the speed of learning can be increased.

As described above, in the first embodiment, differential values are calculated in asynchronous distributed processing, with the staleness s being taken into account. Because of this, the accuracy of differential value approximation is increased even in the case of asynchronous learning, which is a case where the parameters at the time of differential value calculation do not match the parameters at the time of parameter update. As a result, the speed of descent of the objective function becomes higher, and parameters can be updated at high speed.

Second Embodiment

An improvement of the first embodiment is now described. In an early stage of learning, the absolute value of a differential value might become a large value. In such a case, the parameter update in the early stage of learning might become unstable. Specifically, the variation of the objective function might become too large and cause a decrease in the descent speed, or the value of the objective function might diverge infinitely.

Empirical evidence shows that such instability is specific to early stages of learning, and does not cause any problem in the middle and later stages of learning. To eliminate the instability in early stages of learning, it is preferable to adopt one of the methods described below.

In a first example, when a parameter update module 3 performs parameter update with a value obtained by multiplying a differential value by a learning coefficient η, the learning coefficient η is restricted to a small value in the early stages of learning, and is gradually increased to a target value as the learning progresses. This means that the steps of the parameter update are narrowed in the early stages of learning, and the range of parameters to be predicted is limited to a relatively narrow range. As a result, the instability is effectively eliminated.

In a second example, a differential value calculator 2 keeps a momentum coefficient γ at a small value in early stages of learning, and gradually increases the momentum coefficient γ to a target value as the learning progresses. In this case, the effect of the momentum term V is small, and a more approximate fundamental asynchronous update formula is achieved in the early stages of learning. Thus, high stability can be expected.

In both the first example and the second example, after the early stages of learning in which differential values might vary greatly, it is preferable to reach a target value.

In a third example, a learning method by which a stable operation can be performed (such as a synchronous learning method) is adopted in early stages of learning. After the early stages of learning, the above described parameter update according to the first embodiment may be performed.

In a fourth example, the parameter update according to the first embodiment is performed in early stages of learning, but a threshold operation may be performed so that the absolute value of an amount of update of the obtained parameters does not exceed a predetermined value.

In a fifth example, the parameter update according to the first embodiment is performed in early stages of learning, but the amount of update may be rescaled so that the norm of the amount of update of the obtained parameters does not exceed a predetermined value.

Two or more methods of the first to fifth examples may be appropriately combined.

As described above, in the second embodiment, the objective function can be prevented from becoming unstable in an early stage of learning.

EXAMPLES

Figure 8:
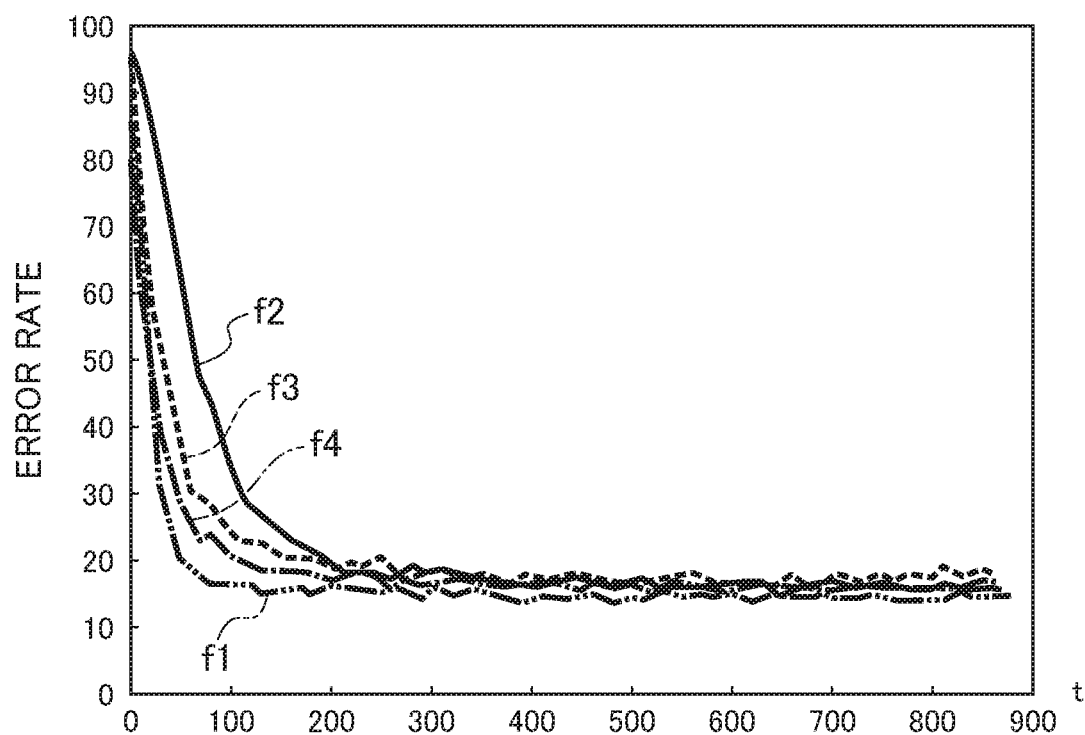
FIG. 8 is a graph showing the changes in error rates obtained when learning is repeatedly performed.

FIG. 8 is a graph showing the changes in error rates obtained when learning is repeatedly performed. In the graph, the abscissa axis indicates time or the numbers of times update is performed. The ordinate axis indicates error rates that are false recognition rates. A curve f1 represents the result of application of the first example in the second embodiment to the first embodiment. Curves f2 and f4 are shown for reference, and represent a result of an asynchronous momentum method, a result of a synchronous momentum method, and a result of a synchronous NAG method, respectively. The mini batch sizes are almost the same (about 256), and the CNN structure includes 10 convolution layers, one total coupling layer, and five pooling layers.

As shown in FIG. 8, where an error rate of 20% was the target rate, the curve f1 based on the present technology reached the target rate in a shorter time (almost half the time required by the curve f3) than the other curves f2 to f4. This proves the benefit of the present technology.

The above embodiments are disclosed for enabling those with ordinary knowledge in the technical field of the present invention to carry out the present invention. Various modifications of the above embodiments should be obvious to those skilled in the art, and the technical ideas of the present invention can be applied to other embodiments. Therefore, the present invention is not limited to the above embodiments, and should be construed as including a wider technical scope based on the technical ideas defined by the claims.

What is claimed is:

1. A learning system that updates a parameter for a neural network, the learning system comprising:
    a plurality of differential value calculators; and
    a parameter update module,
    wherein each of the differential value calculators, which are not synchronized with one another:
        receives a parameter of a certain time from the parameter update module,
        calculates a differential value to be used for updating the parameter, based on the received parameter, and
        transmits the differential value to the parameter update module,
    wherein the parameter update module:
        receives the differential value from the differential value calculator,
        updates the parameter such that an objective function becomes smaller by a mini-batch stochastic gradient method based on the received differential value, not in synchronization with differential value calculation by the plurality of differential value calculators, and
        transmits the updated parameter to the plurality of differential value calculators,
    wherein when calculating the differential value, the differential value calculator takes staleness into account, the staleness corresponding to a number of times the parameter is updated during a period between a time when the parameter is received and a time when the calculated differential value is used by the parameter update module in updating the parameter,
    wherein the objective function is obtained by combining functions based on quantified differences between the neural network and ideal output values for all learning data,
    wherein the mini-batch stochastic gradient method uses a portion of learning data among all of learning data in updating the parameters once,
    wherein each of the leaning data comprises a set of image data to be recognized and ideal output value corresponding to the image data,
    wherein the updated parameter causes the neural network to return a desired output when image data is input as a recognition object such that updating the parameter trains the neural network.

2. The learning system according to claim 1, wherein, taking the staleness into account, the differential value calculator calculates a predicted value of a parameter of a time when the calculated differential value is used by the parameter update module in updating the parameter, and calculates the differential value by differentiating the predicted value.

3. The learning system according to claim 2, wherein the differential value calculator calculates the predicted value, based on the parameter of the certain time and a parameter of an earlier time than the certain time, and the staleness.

4. The learning system according to claim 3, wherein, when the parameter of the certain time τ is represented by $W^{(\tau)}$, the parameter of the earlier time (τ−1) than the certain time is represented by $W^{(\tau-1)}$, the staleness is represented by $s_n$, and a coefficient $\gamma \varepsilon (0,1)$,
the predicted value $P^{(\tau)}$ is expressed by the equation:

[Mathematical Formula 1]

$$P^{(\tau)} = W^{(\tau)} + \sum_{u=1}^{s_n+1} \gamma^u (W^{(\tau)} - W^{(\tau-1)})$$

5. The learning system according to claim 4, wherein the differential value calculator gradually increases the coefficient γ as learning progresses.

6. The learning system according to claim 1, wherein the parameter update module updates the parameter using a value obtained by multiplying the differential value by a learning coefficient, and increases the learning coefficient as learning progresses.

7. The learning system according to claim 1, wherein the parameter update module adjusts an update amount of the parameter, to prevent an absolute value or a norm of the update amount of the parameter from exceeding a first value until the parameter is updated a first number of times since a start of learning.

8. A learning method to update a parameter for a neural network, the learning method comprising:
    for each of a plurality of differential value calculators, which are not synchronized with one another:
        receiving a parameter of a certain time from a parameter update module,
        calculating a differential value to be used for updating the parameter, based on the received parameter,
        transmitting the differential value to the parameter update module;
    the parameter update module:
        receiving the differential value from the differential calculators;
        updating the parameter such that an objective function becomes smaller by a mini-batch stochastic gradient method based on the received differential value, not in synchronization with differential value calculation by the plurality of differential value calculators; and
        transmitting the updated parameter to the plurality of differential value calculators,
    wherein upon calculating the differential value by the differential value calculator, staleness is taken into account by the differential value calculator, the staleness corresponding to a number of times the parameter is updated during a period between a time when the parameter is received and a time when the calculated differential value is used by the parameter update module in updating the parameter,
    wherein the objective function is obtained by combining functions based on quantified differences between the neural network and ideal output values for all learning data,
    wherein the mini-batch stochastic gradient method uses a portion of learning data among all of learning data in updating the parameters once,
    wherein each of the leaning data comprises a set of image data to be recognized and ideal output value corresponding to the image data, wherein the updated parameter causes the neural network to return a desired output when image data is input as a recognition object such that updating the parameter trains the neural network.

9. The learning method according to claim 8, wherein, taking the staleness into account, the differential value calculator calculates a predicted value of a parameter of a time when the calculated differential value is used by the parameter update module in updating the parameter, and calculates the differential value by differentiating the predicted value.

10. The learning method according to claim 9, wherein the differential value calculator calculates the predicted value, based on the parameter of the certain time and a parameter of an earlier time than the certain time, and the staleness.

11. The learning method according to claim 10, wherein, when the parameter of the certain time $\tau$ is represented by $W^{(\tau)}$, the parameter of the earlier time ($\tau-1$) than the certain time is represented by $W^{(\tau-1)}$, the staleness is represented by $s_n$, and a coefficient $\gamma\varepsilon(0,1)$, the predicted value $P^{(\tau)}$ is expressed by the equation:

[Mathematical Formula 1]

$$P^{(\tau)} = W^{(\tau)} + \sum_{u=1}^{s_n+1} \gamma^u (W^{(\tau)} - W^{(\tau-1)})$$

12. The learning method according to claim 11, wherein the differential value calculator gradually increases the coefficient $\gamma$ as learning progresses.

13. The learning method according to claim 8, wherein the parameter update module updates the parameter using a value obtained by multiplying the differential value by a learning coefficient, and increases the learning coefficient as learning progresses.

14. The learning method according to claim 8, wherein the parameter update module adjusts an update amount of the parameter, to prevent an absolute value or a norm of the update amount of the parameter from exceeding a first value until the parameter is updated a first number of times since a start of learning.

* * * * *